(12) United States Patent
Heldoorn

(10) Patent No.: US 8,173,065 B2
(45) Date of Patent: May 8, 2012

(54) METHOD, SYSTEM AND APPARATUS FOR A TAKEOUT HOLDER AND INSERT

(76) Inventor: Fred Heldoorn, Southlake, TX (US)

( * ) Notice: Subject to any disclaimer, the term of this patent is extended or adjusted under 35 U.S.C. 154(b) by 811 days.

(21) Appl. No.: 12/242,249

(22) Filed: Sep. 30, 2008

(65) Prior Publication Data

US 2009/0092512 A1    Apr. 9, 2009

Related U.S. Application Data

(63) Continuation-in-part of application No. 11/187,307, filed on Jul. 22, 2005, now abandoned, which is a continuation-in-part of application No. 10/783,452, filed on Feb. 20, 2004, now Pat. No. 7,472,565.

(60) Provisional application No. 60/461,542, filed on Apr. 9, 2003.

(51) Int. Cl.
*B22F 1/00* (2006.01)

(52) U.S. Cl. .......................................... 419/30; 419/38
(58) Field of Classification Search .................... 419/30
See application file for complete search history.

(56) References Cited

U.S. PATENT DOCUMENTS

| RE34,953 E | * | 5/1995 | Denney et al. .................. 65/260 |
| 6,776,936 B2 | * | 8/2004 | Hardcastle et al. .......... 264/29.1 |

* cited by examiner

*Primary Examiner* — George Wyszomierski
*Assistant Examiner* — Tima M McGuthry Banks
(74) *Attorney, Agent, or Firm* — Geoffrey A. Mantooth

(57) ABSTRACT

The present invention provides an apparatus, system and method for handling glass containers that has a takeout jaw assembly with a base with a first side, a second side and a groove. The groove extends from the first side to the second side and is adapted to fit an insert. The groove also has a recess with one or more flexible retaining tabs positioned to secure the insert and a yoke extending substantially perpendicular from the base.

9 Claims, 9 Drawing Sheets

METHOD, SYSTEM AND APPARATUS FOR A TAKEOUT HOLDER AND INSERT

CROSS-REFERENCE TO RELATED APPLICATIONS

This application is a continuation-in-part and claims priority based on U.S. patent application Ser. No. 11/187,307, filed Jul. 22, 2005, now abandoned, which is a continuation-in-part of U.S. patent application Ser. No. 10/783,452, filed Feb. 20, 2004, now U.S. Pat. No. 7,472,565, and which claims priority to U.S. Provisional Application Ser. No. 60/461,542, filed Apr. 9, 2003, all of which are incorporated herein by reference.

TECHNICAL FIELD OF THE INVENTION

The present invention relates general to glass bottle manufacturing, and in particular, to takeout holders and associated inserts.

BACKGROUND OF THE INVENTION

Without limiting the scope of the invention, its background is described in connection with take out holders and takeout holder inserts, as an example. Past technology has used a metallic takeout holder and a nonmetallic insert specially adapted to contact a hot glass bottle, lift the hot glass bottle from the forming molds and carry it to the cooling table. In the forming and processing of hot glass into bottles, the bottles are susceptible to being damaged by the processing equipment. Most of the processing equipment used in the manufacturing of hot glass products is fabricated from metallic materials such as brass, stainless steel and metal alloys. It is understood that the actual contact point of the holder to the hot glass bottle is benefited by use of nonmetallic material such as is asbestos, carbon fiber and graphite.

In the manufacturing of glass bottles, the manufacturing equipment uses a fixture referred to as a bottle takeout holder to lift and carry the newly formed hot bottles to a cooling table, before proceeding to an annealing furnace. Current takeout holders are fabricated from materials such as steel, stainless steel or brass, and have a separate, insert, which comes in direct contact with the bottle. The insert is often made of a nonmetallic material to decrease the chances of chipping or cracking due to localized heat transfer or thermal shock.

The commonly used manufacturing processes are limited by the state of the current technology, e.g., U.S. Pat. No. RE 34,953. The most common material used with the current takeout holder insert is graphite, although graphite has the drawback of high-cost in manufacturing from a raw billet.

One of the major disadvantages in the current manufacturing process is the significant wear caused by movement between the nonmetallic insert and the abrasive metallic holder at the point where the two materials contact. One approach to minimizing the movement is the use of a spring clips fitted to an indention in the insert; however, the spring clips fatigue resulting in the inserts falling out of the takeout holder. The use of spring clips in high production bottling operations reduces, but do not entirely eliminate, wear between the holder and the insert. Still another disadvantage of the current manufacturing process is the reduced service life and increased maintenance associated with chipping, cracking and oxidation of graphite inserts.

The foregoing problems have been recognized for many years and while numerous solutions have been proposed, none of them adequately address all of the problems in a single device, e.g., reducing movement, eliminate chipping, cracking, and oxidation, while increasing service life.

SUMMARY OF THE INVENTION

The present inventor recognized a need for a takeout holder and insert manufactured from dissimilar materials and with an insert under tension to reduce movement and reducing both time and cost in manufacturing, while providing a longer life expectancy with the use of energy saving high temperature engineered materials to reduced ware, elimination of chipping, cracking and oxidation.

In accordance with the present invention, a system, a method and apparatus are provided that include, a holder and a ceramic insert. The holder may be made of numerous materials that can withstand the temperature requirements, e.g., metals, alloys, plastics, thermoplastic, ceramic, composites, and the like. The insert is designed to contact the holder and fit the container through the contour or profile of the insert accommodating the container. The bottle head contouring of the insert can be addressed in the design of the ceramic insert forming, allowing large quantities to be produced and eliminating machining processes. The present invention offers high strength, heat resistant, holder and ceramic insert, e.g., the cost of manufacturing is reduced, the plastic holder is resistance to cracking and chipping, thereby generating higher yields of bottle product.

In some embodiments, the insert has a wedge shaped profile, allowing the insert to be firmly wedged between corresponding wedge shaped groove of the holder. The wedge shaped insert and holder substantially reduces and/or eliminates the movement during bottle making operations, thereby reducing the wear associated with current holders and inserts. The wedge shaped insert may also contact one or more tensioning tabs associated with the holder, to further secure the insert.

A method, system and apparatus are also provided that include a takeout jaw assembly for handling glass having a base in the shape of a semicircular annulus with a curved front surface having a groove with a first radius. A curved rear surface having a radius greater than that of the curved front surface is provided that is in a substantially annular relationship with the front surface. A recess having one or more retaining tabs is positioned tangential from the groove. An alignment mechanism is positioned on a portion of the curved front surface and designed to mate with the alignment mechanism on the curved front surface of another base. A semicircular insert is adapted to fit the groove and includes, an insert body in the form of an annulus with curved first and second surfaces with a lug extending radially outwardly from a portion of the curved second surface. The lug fits the recess and contacts the one or more retaining tabs to frictionally secure the semicircular insert body. A yoke is also provided that extends substantially perpendicular from the base.

For example, the present invention also includes a takeout jaw having a base with a first side, a second side and a groove extending from the first side to the second side. The groove is adapted to fit an insert and includes a recess having one or more flexible retaining tabs. The one or more flexible retaining tabs are in communication with the groove and positioned to secure the insert and a yoke extending substantially perpendicular from the base allowing the takeout jaw to be secured. The general size and shape of the holder may vary depending on the particular application and needs of the user or manufacturer. The holder may be square, round, oval, triangular, polygonal and the like or combinations thereof.

The holder may have a different thickness at different positions of the holder. For example, the holder may be square in shape having a groove that is square (or alternatively curved) to fit the correspondingly shaped insert.

The insert may be, e.g., an annulus having first and second curved surfaces with a lug extending radially outwardly from a portion of the second curved surface, wherein the lug fits the recess and contacts the one or more flexible retaining tabs to frictionally secure the insert. The first curved surfaces of the insert may be adapted to fit a bottle, e.g., glass, metal, ceramic, composite or combinations thereof. Generally, the first curved surface is contoured to fit a portion of the bottle, e.g., the bottle neck. As the two first portions of opposing takeout jaws come together, an aperture is formed to fit the bottle. The bottle is secured in the takeout jaw, allowing the bottle to be moved. The aperture will be defined by the profile of the first curved surface, which the skilled artisan will recognize can have a variety of shapes and profiles. The aperture may have different profiles to accommodate different bottle shapes and sizes. However, the first curved surface of the insert may be adapted to fit a variety of objects having a lip or areas of different diameter. Furthermore, the object need not be cylindrical in shape, as objects of different shapes and corresponding insert will be accommodated equally well e.g., a bat, a vase, a bottle, a figurine, a beaker, a flask, a cylinder, a crucible, a vial and the like.

In another example, the present invention includes a takeout jaw having a base with a front side, a back side and a lip extending across the front side. The lip is in communication with one or more retaining tabs positioned to secure the insert. A yoke extending substantially perpendicular from the base is also provided. The one or more retaining tabs may be positioned in a recess extending substantially tangentially to the lip in a mating relation to retain the insert. The insert has a lug positioned at the back of the insert in a mating relationship to the recess. The insert fits onto the lip and the lug fits into the recess, allowing the one or more retaining tabs to contact and secure the insert.

The present invention also includes a method of moving an object by contacting a portion of an object with a pair of mating semicircular takeout jaws. Each of the takeout jaws includes a base with first and second opposed sides and a groove extending from the first side to the second side. An insert is also provided that fits the groove and is adapted to fit the object. The groove has a recess with one or more retaining tabs in communication with the groove and positioned to secure the insert. The present invention also includes a yoke extending substantially perpendicular from the base for attachment. The yoke may be attached to a machine which can be used to open or close the pair of takeout jaws, wherein the takeout jaws form an enclosure around the bottle to secure it for movement. As the skilled artisan will recognize the base may be semicircular and the groove may be semicircular, either the base or the groove may be semicircular and the base and the groove need not be of a particular shape, width, height, thickness, weight, density, etc., except as necessitated by the particular parameters of the object.

The one or more retaining tabs are designed to contact and frictionally fit the insert. The one or more retaining tabs may formed a resilient part of the takeout jaw and extend into the recess. The one or more retaining tabs may be made of metal, which can flex to accommodate the insert. In some embodiments the one or more retaining tabs are a portion of the base; however, the one or more retaining tabs may be formed on a tab insert that can be removably positioned in the recess and replaced as necessary. The recess may have an area that can accommodate the one or more tabs when compressed by the insert. The one or more retaining tabs may be made as an integrated portion of the insert; however, the one or more retaining tabs may be made from a material that is different from the insert. Friction is exerted on the holder and the insert by the one or more retaining tabs extending outward form the holder to contact a portion of the insert. The insert presses against the one or more retaining tabs as it is fit into the groove. The one or more retaining tabs move to accommodate the insert and create a pressure holding the insert in position. The contact between the insert and the one or more retaining tabs creates tension against the insert. In some instances, the one or more retaining tabs contact a lug on the insert; however, the skilled artisan will recognize that other contact areas may be used, e.g., indentions and extensions. Additionally, the one or more retaining tabs may be located on one or more sides of the recess to secure the insert, e.g., one or more retaining tabs on the sides parallel to the yoke, the sides perpendicular to the yoke, on the side parallel and on the side perpendicular to the yoke, one on all sides or a single side. In other embodiments, the one or more retaining tabs may be located on the lug of the insert. To further secure the insert, the grove may be tapered to fit a mating tapered insert.

The present invention also includes one or more alignment mechanisms positioned on a first side, a second side or both the first side, the second side, wherein the one or more alignment mechanisms align two takeout jaw bases. The alignment mechanism allows two bases to align properly and create an area to accompany an object, e.g., bottle, vase, container, bat and etc. The alignment mechanism may take various forms, e.g., pin and hole, slot and notch, groove and notch and etc. Based on the present disclosure, the skilled artisan will recognize that other alignment mechanisms may be used.

The present invention includes a takeout jaw assembly for handling an object that includes a base in the shape of a semicircular annulus with a curved front surface having a groove with a first radius and a curved rear surface with a radius greater than that of the curved front surface. The groove has a substantially annular relationship with the front surface and a recess that is positioned tangential from the groove. The recess has one or more flexible retaining tabs. The base also has a yoke extending substantially perpendicular from the base, whereby the takeout jaw can be mounted. The present invention may further include a semicircular insert body in the form of an annulus with a curved first surface and a curved second surface. The curved first surface is adapted to fit an object, e.g., bottle, vase, etc. The semicircular insert body includes a lug extending radially outwardly from a portion of the curved second surface. The lug fits frictionally the recess and contacts the one or more flexible retaining tabs to secure the semicircular insert body to the base.

The present invention also includes a bottle manipulating system with a takeout mechanism having a first takeout jaw assembly and a second takeout jaw assembly in operable communication. Each of the takeout jaw assemblies has a base in the shape of a semicircular annulus with a curved front surface, a groove and a curved rear surface in a substantially annular relationship. The curved front surface has a groove with a first radius and the curved rear surface has a radius greater than that of the curved front surface. The groove has a tangential positioned recess with one or more flexible retaining tabs. The present invention also provides a semicircular insert with an insert body in the form of an annulus, having a curved first and second surface. The curved first surface fits a container, while the curved second surface fits the groove in the base. The curved second surface also has a lug extending radially outwardly. Therefore, the semicircular insert fits the groove and the lug contacts the one or more flexible retaining tabs in the recess to frictionally secure the semicircular insert. A yoke extending substantially perpendicular from the semicircular base is also provided. The present invention also provides one or more conveyer belts in operable communication with the takeout mechanism. The takeout mechanism is positioned adjacent to the container (e.g., the bottle) on the conveyer belt. The takeout mechanism then positions the takeout jaw assemblies so that the inserts will contact the container as the takeout jaws are closed. The takeout jaws close around the container and the takeout mechanism can then move the container to another conveyer belt, cooling table or other surface.

The present invention also provides a method for making a ceramic inserts used in bottle manufacturing by combining raw ingredient including one or more ceramic powder to form a ceramic precursor and pressing the ceramic precursor in a die having an insert body in the form of an annulus, having a curved first surface adapted to fit a glass container and a curved second surface adapted to fit a takeout holder. The ceramic precursor is then cured to form a green ceramic precursor and heated at a temperature below about 800° F. to form the green ceramic precursor.

Any of the different embodiments herein may also include an alignment mechanism positioned on the curved front surface, wherein the alignment mechanism is designed to mate with the alignment mechanism of another base. In other embodiments, the body may have a shape that is generally square, oval, rectangular, triangular, or combination thereof. Additionally, the insert may have a shape that is generally square, oval, rectangular, triangular, or combination thereof. The skilled artisan will recognize the body and the insert may have similar shapes or different shapes.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

Heat resistant plastic suitable for constructing bottle holders have been available for many years, e.g., Ryton® plastic was substantially developed by the earlier 1970's. However, it was not until the present invention that plastics were proposed and successfully used to manufacture bottle holders. Similarly, ceramics are well-known, yet never used, in the construction of bottle holder inserts. The composites embodiments of the present invention, (e.g., plastic and ceramic alumina and alumina-zirconia) allow ease in manufacture and a substantial reduction in manufacturing costs, compared to traditional devices made from metal, graphite and similar materials. For example, not only are these materials easier to work with and less expensive, but plastics can also be re-used, e.g., thermoform plastics.

The present invention provided an apparatus, system and method that are used in takeout holders and associated inserts used in glass bottle manufacturing and includes a takeout jaw assembly for handling glass bottles. The takeout jaw assembly includes a base in the shape of a semicircular annulus with a curved front surface having a groove with a first radius, a curved rear surface having a radius greater than that of the curved front surface in substantially annular relationship with the front surface. The groove has a tangentially positioned recess with one or more retaining tabs. The curved front surface includes an alignment mechanism positioned to mate with the alignment mechanism of another base. The present invention also includes a semicircular insert with an insert body in the form of an annulus adapted to fit the groove. The insert body has a curved first surface adapted to fit a bottle or other object and a curved second surface with a lug extending radially outwardly. The lug fits frictionally the recess and contacts the one or more flexible retaining tabs to secure the insert body to the base. The base also has a substantially perpendicular yoke.

Figure 1:
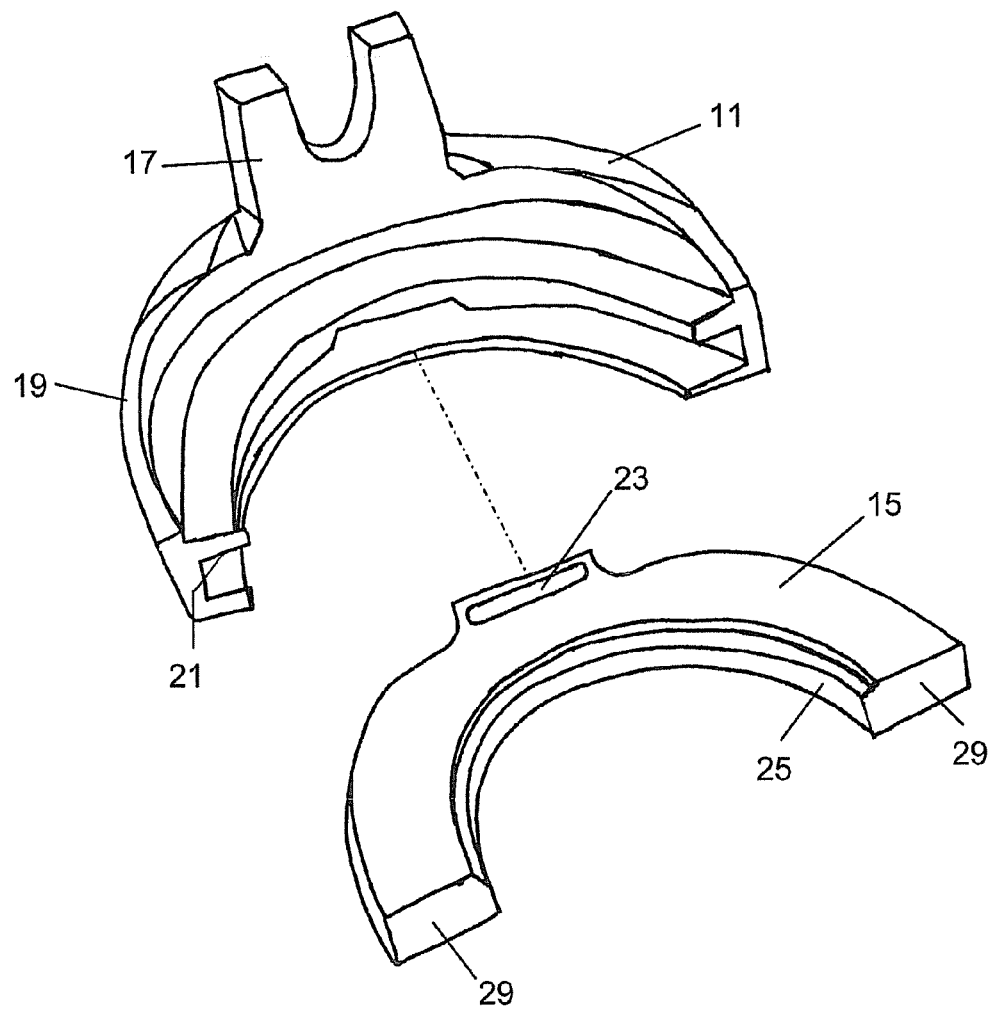
FIG. 1 illustrates a perspective view of the takeout jaw and insert, in accordance to an embodiment of the present invention.

In FIG. 1, there is shown a takeout jaw 11 and an insert 15. The takeout jaw 11 has a semicircular body 19 and a yoke 17 for attachment to a lifting arm (not shown). A semicircular groove 21 is formed in the semicircular body 19 to receive the insert 15.

The insert 15 has a depression 23 and a hole therein for securing inside the takeout jaw 11. The insert 15 has a semicircular inside surface 25 for contacting the neck of a glass bottle 27. The inside surface 25 can be flat, contoured to match the bottle 27 or threaded to match the bottle threads (not shown). The insert 15 has two flat surfaces 29 for alignment with the surfaces of an opposing insert 15 contained in an opposing takeout jaw 11.

In one embodiment, the insert 15 is made from a moldable high temperature plastic, which will withstand the temperature of the glass bottle 27, while maintaining shape and function, e.g., the plastic can be: a graphite mineral phenolic resin, a glass fiber phenolic, a mineral glass fiber phenolic or a mineral phenolic or a combination thereof. Each of the above plastics is of the thermoset type and can be molded. The inserts may be made from other materials, e.g., composites, carbon fiber, Kevlar, nanomaterials, ceramics, alloys and combinations and mixtures thereof.

Figure 2:
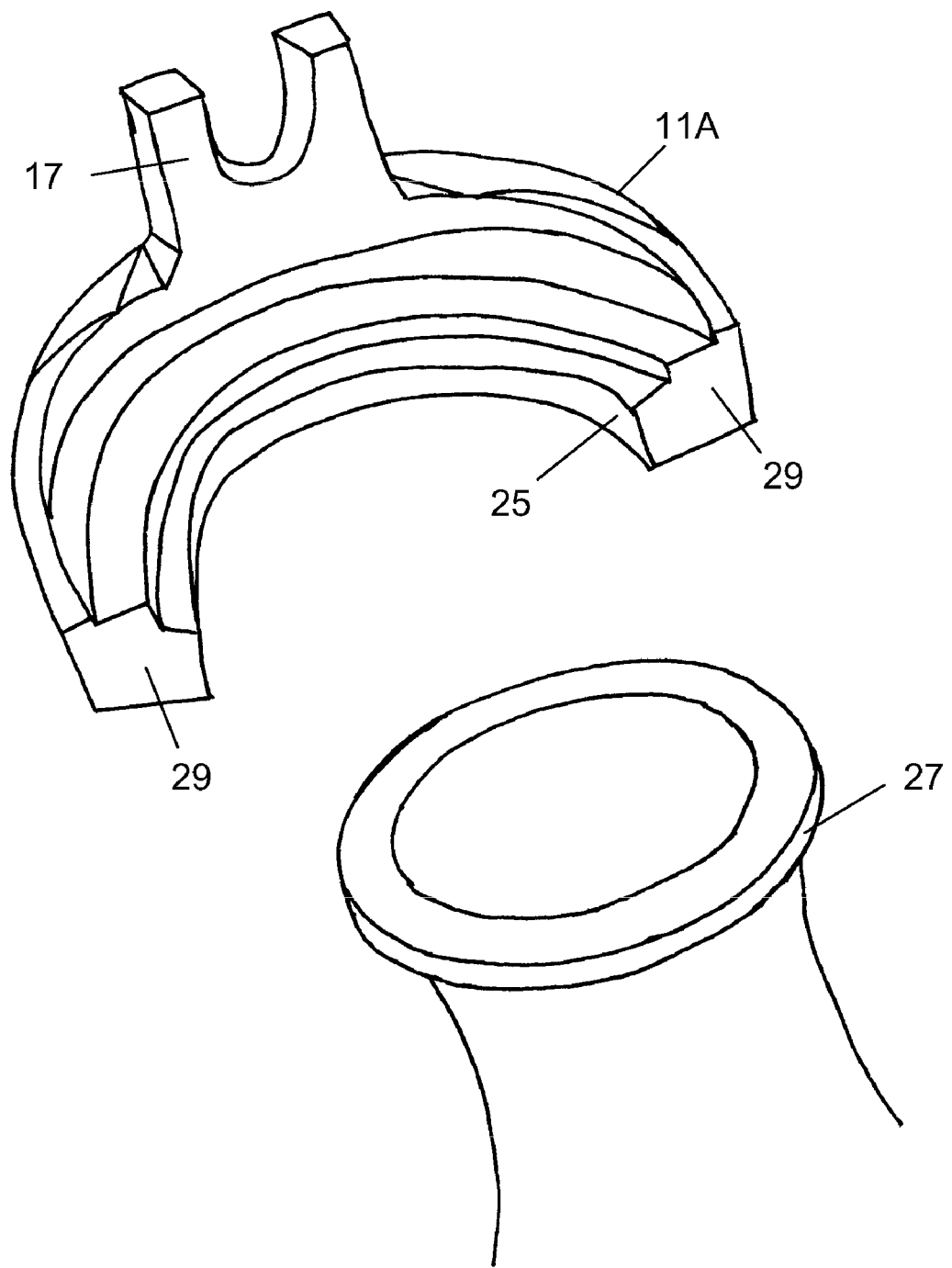
FIG. 2 illustrates a perspective view of the single piece takeout jaw, in conjunction with a bottle in accordance to an embodiment of the present invention.

FIG. 2 shows a one-piece takeout jaw and insert combined into a single molded component 11A. The takeout jaw 11A may be made of the same material as the insert 15. The takeout jaw 11A and insert 15 are integrated and no channel is required. There is no relative movement between the inside surface 25 and the yoke 17.

The present invention is a major improvement to prior designs with dissimilar materials, which have a shorter life expectancy and frequent downtime with changing of worn parts reduces bottle yield. The design of the takeout holder 11A allows for the injection mold to combine the insert 11A and the body 11A to eliminate the precision machining, inspection and tooling costs. The one piece design also permits a more precise holder 11A with respect to both dimensions and alignment, which in turn permits a more accurate location on the bottle elevating misalignments. Injection molding of one-piece a holder 11A allows the inside surface 25 to include a bottle neck contour in the molding process. The new high temperature engineered plastics will ensure protection against cracking and chipping a common problem associated with the existing graphite inserts.

Figure 3A:
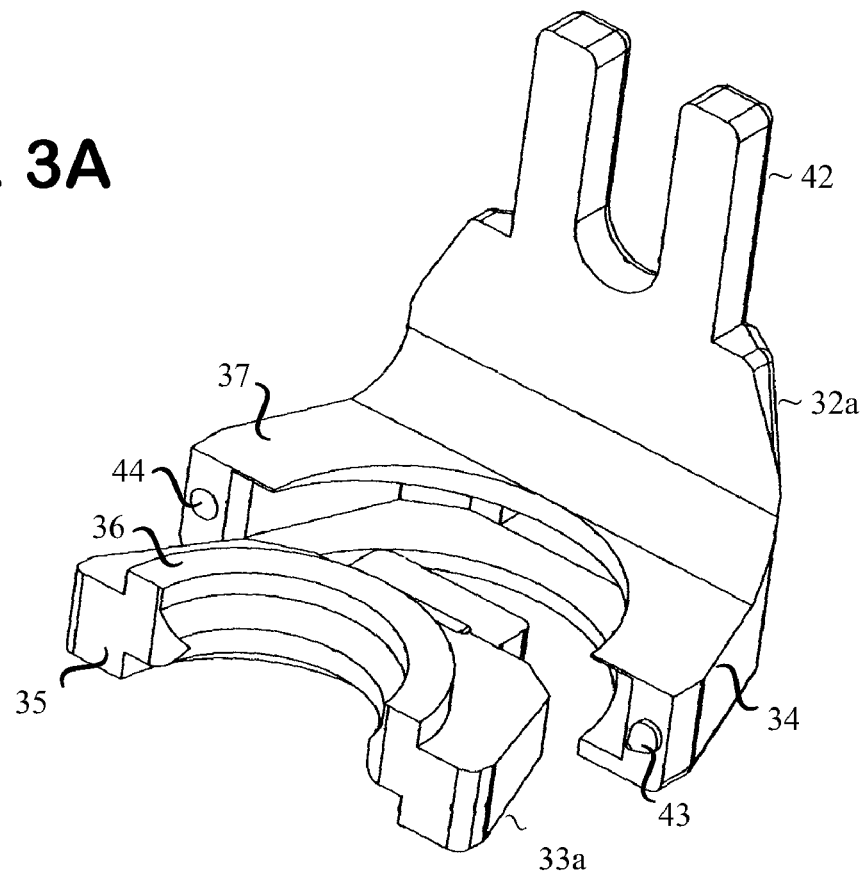
FIG. 3A is perspective views of left and right takeout jaws, which, along with the associated inserts, according to one embodiment of the present invention.
Figure 3A:
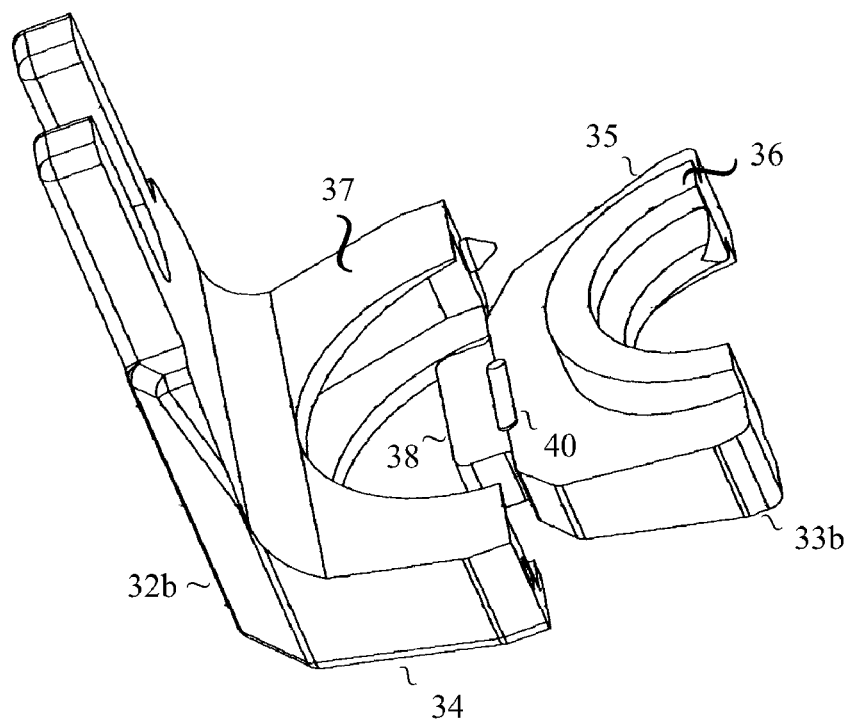

FIG. 3A illustrates first and second takeout jaws 32a and 32b, and associated semicircular inserts, 33a and 33b, according to one embodiment of the present invention. Each takeout jaw 32a and 32b includes a plastic body 34, which defines a semicircular aperture. The aperture receives the corresponding insert 33a or 33b. Exemplary plastics include Plenco® two-stage phenolic compression molded plastics Nos. 06553, 04349, 05350, and 06582, and Phillips 66 Ryton® A-200 polyphenylene sulfide; however, other materials may be used, e.g., composites, carbon fiber, Kevlar, nanomaterials, ceramics, alloys and combinations and mixtures thereof.

The takeout jaws 32a and 32b, associated semicircular inserts, 33a and 33b or both may be made from a variety of materials including ceramic materials, thermosetting materials, thermoplastic resin, metals, alloys, composites, graphite, mixtures and combinations thereof. Exemplar thermoplastic resin used to form the takeout holder and/or the insert include polyamide, phenol resin, diaryl phthalate resin, unsaturated polyester resin, epoxy resin, polyimide resin and triazine resin.

It is known that ceramic is an amorphous material obtained by melting of crystalline compounds followed by cooling down of the melted mass. The process by which a ceramic is formed is called vitrification and is basically the exposing of the material to extreme heat for careful drying and maturing of the coating. A ceramic material is prepared from natural crystalline products, which, submitted to a syntherization process, partially melt and are transformed into new crystalline phases. Ceramics are formed at temperatures above 800° C. and differing styles of ceramic are formed at different temperatures and generally from about 1,400° F to 2,600° F.

The process of forming ceramics involves the use of temperature programs to vary the final temperature and rate of temperature change as a function of time. Each stage usually has a ramp rate or hold time allowing accurate automatic control of the entire firing process. Programs can be quite involved and complicated; but basically, include the setting of the end temperature to reach and the temperature rate, in the case of the up or down ramp, the rate change in degrees per hour. A program may include different segments or steps having different temperatures and rates.

Temperatures range used in the present invention include low fire, medium fire, high fire and combinations thereof. Basically, the firing may be done at low-fire usually in the range of approximately 1,400° F. to approximately 2,600° F. or at high-fire usually in the range of approximately 2,000° F. or above, and in some instances above approximately 2,200° F. The skilled artisan will know the numerous combinations of time, temperature, rate and hold duration that may be used to fire the ceramics of the present invention. One exemplar temperature profile is included in Table I.

| Segment | Rate (° F.)/hr | Temperature (° F.) | Hold |
|---------|---------------|--------------------|------|
| 1       | 150           | 250                | 10   |
| 2       | 250           | 1,000              | 10   |
| 3       | 180           | 1,150              | 0    |
| 4       | 300           | 1,915              | 10   |
| 5       | 120           | 2,230              | 0    |

Another firing profile includes the initial firing of the ceramic at 200° F. for 4-12 hours to remove moisture. The ceramic is then heated slowly (e.g., 100-200° F. per hour) to about 900° F., and held at this temperature for another 4-12 hours to allow the organic materials to carbonize and release as many gasses as possible. The ceramic is then heated slowly (e.g., 200-300° F. per hour) to at least 2,000° F. for an hour or two to allow the gradual burnout of the rest of the carbon-based materials. The ceramic is heated to above 2,000° F. to burn out the organic texture materials. The ceramic is cooled at about 100-250° F. per hour In one embodiment, inserts 33a and 33b are formed from ceramic made of clay or a similar substrate material and alumina. For example, the ceramic is composed of about 40 to about 45% mulcona 60 alumina, about 35 to about 40% D6 clay, about 10 to about 15% talc, about 5 to about 10% spinks clay, and about 1 to about 5% feldspar, fit or other releasing agent. Optionally one or more coatings may be used, e.g., glaze, stain, paint, sealant ceramic of a similar or different composition.

Generally, a coating may be applied to the ceramic e.g., a glaze, a stain or an overglaze, a paint, a composite, a fiber, a nanoparticle, and other substance known to the skill artisan. However, the skilled artisan will recognize that any substance that will withstand the operation temperature of the ceramic may be used. Many different coating may be used and the coating characteristics may varied depending on the firing type, firing durations, temperature rate, final temperature, composition and ceramic composition, etc. In addition, multiple coating of similar or different substances may be applied to the ceramic. In addition, the coating may have one or more additives to enhance the characteristics of the coating.

Coatings may be in the form of a solid, liquid or gel and mixed with numerous additives to create the specific characteristics for the individual application. In addition, the coating may be applied by brush, spray gun, dipping, aerosol, depositing and combinations thereof. In one instance, a coating may be applied that melts completely, and the bond between the coating and the ceramic becomes more complete as the temperature rises. The ingredients of the ceramic and coating can be matched to each other so that the molten layer between the two bond and form a protective layer for the ceramic.

Another embodiment of the inserts 33a and 33b are formed of ceramic made of clay or a similar substrate material and alumina. For example, the ceramic is nominally composed of about 40 to about 45% mulcona 60 alumina, about 35 to about 40% D6 clay, about 5 to about 15% fused silica, about 5 to about 10% spinks clay, and about 1 to about 5% feldspar, fit or other releasing agent. In addition, the takeout jaws 32a and 32b, and associated semicircular inserts, 33a and 33b of the present invention may use ceramic materials such as $SiO_2$, $Si_3N_4$, $ZrO_2$, $Al_2O_3$, SiC, BN, WC, TiC, Sialon, porcelain clay, feldspathic clay, kaolinite, and so forth. In some embodiments a glass-ceramic in the form of a powder which has the formula: $SiO_2$—$Me_2'''O_3$—Me"O may be used, wherein Me"

is selected from the group consisting of Ca, Ba, Mg, Zn and mixtures thereof, wherein Me''' is selected from the group consisting of Al, B and mixtures thereof.

Alumina dissipates heat, which allows inserts 33a and 33b to dissipate the heat from encircled bottle neck. Ceramic inserts 33a and 33b also have improved wear and shock resistance not present in graphite inserts. Optionally, coatings may be applied to the insert 33. In one embodiment, the coating is a glaze is a ceramic product consisting of fondents and silica based glasses which are grinded in granules of the wanted dimensions and thereafter applied on the appropriate substrate and heated so that the grinded granules melt (totally or partially) covering the substrate surface.

The glazes can be produced via the processes traditionally used for the production of glazes. A glass-ceramic according to the invention and a starting material usually employed for the production of ceramic glazes were loaded in the appropriated proportions to obtain a so called coating were applied by brush, dipping, airbrush, threading die, serigraphy, crude, biscuited, vapor deposited, obtained by pressing of atomized or dry-grinded powders. The coating, solution, dried or granulated, can be deposited on the inserts 33a and 33b surface by falling and fixed on the inserts 33a and 33b with appropriated agents known to the skilled artisan. The inserts 33a and 33b is fired in a furnace giving the final product. In one embodiment, the coating is a glaze contains about 30 to 50% by weight silicon metal, 20 to 60% by weight of ball clay and 0 to 50% clay-graphite applied by brush to the insert 33. The skilled artisan will recognize the numerous combinations of time and temperature that can be used to produce the final product.

A wide variety of coatings may be used to prevent oxidation of the ceramic during initial firing, or when subsequently used by the consumer. In addition, the coating of the present invention controlled oxidation of the surface during the manufacturing process. The coating may also contain metal particles, fibers, nanopartical and other materials to enhance the properties (e.g., durability, temperature range, heat transfer, etc.) of the coating.

Furthermore, ceramic inserts 33a and 33b according to the present invention are much easier to manufacture than graphite and metal inserts in the prior art, since extensive machining is not required. The present invention allows in particular, inserts 33a and 33b to be formed in, a die constructed to the desired size and shape. The desired ceramic material is then placed in the die and pressed into shape. The resulting insert 33a or 33b is then hardened. In other embodiments, the insert 33a or 33b is then glazed and re-fired to produce an enhance duribility.

The insert 33a and 33b of the present invention may be machined into the desires shape and dimensions to create the desired profile with a semicircular inside surface 25 for contacting the neck of a glass bottle 27. Alternatively, the insert 33a and 33b may be formed using a cast in a mold, injection molded, milled, pressed, stamped with a die to form a net-shape, or near-net-shape, component. For purposes of this disclosure, all of casting in a mold, injection molding, and die stamping are considered to be equivalent.

For example, the insert 33a and 33b can be constructed using a press, which typically in includes a press unit, a control unit, a furnace and a mechanism to apply force, e.g., hydraulic press. Generally, a die is formed to the specific dimensions of the insert allowing for the individualized container profiles for specific applications. Following modern practice, ceramic particulate raw materials are blended and mixed with 7 to 20% by weight water. The ceramic mixture is then placed into contact with the die to form inserts 33a and 33b by any one of several acceptable means, e.g., mechanical pressing, hand ramming hydraulic pressing or isostatic pressing. All these processes are currently in use by the conventional processes. The ceramic mixture is then dried, typically at an elevated temperature to form a green insert inserts 33a and 33b. A green insert inserts 33a and 33b may be removed for heat treatment. Alternatively, the assembly and green insert inserts 33a and 33b may be subjected to a higher temperature heat treating, or firing, step, e.g., at temperatures about 1,400 to 2,500° F.

In addition, combinations of machining (e.g., molding, milling, pressing, stamping and/or casting) may be used to produce the insert 33. For example, a press or molded of generic inserts 33a and 33b that is adapted to fit the takeout jaw body 34, having an annulus with a curved first surface and a curved second surface that is not adapted to fit a bottle or other container. The curved first surface may be adapted to fit a bottle or other object through a conventional milling process. Optionally, the curved second surface may have a lug extending radially outwardly from a portion of the curved second surface to contact one or more retaining tabs to secure frictionally the semicircular insert body.

Furthermore, variation may be used to create the desired insert. For example, a coating may be applied to a press or molded generic inserts 33a and 33b that is adapted to fit the takeout jaw body 34, having an annulus with a curved first surface that is not adapted to fit a bottle or other object and a curved second surface. A coating (e.g., glaze) is applied to the insert and re-fired. The coated insert holder is then machined to produce a profile adapted to fit a bottle or other object. As the machining removes the ceramic material to form the profile, the coating is also removed from the machined portion, thus producing portions with a coating and without a coating.

Figure 3B:
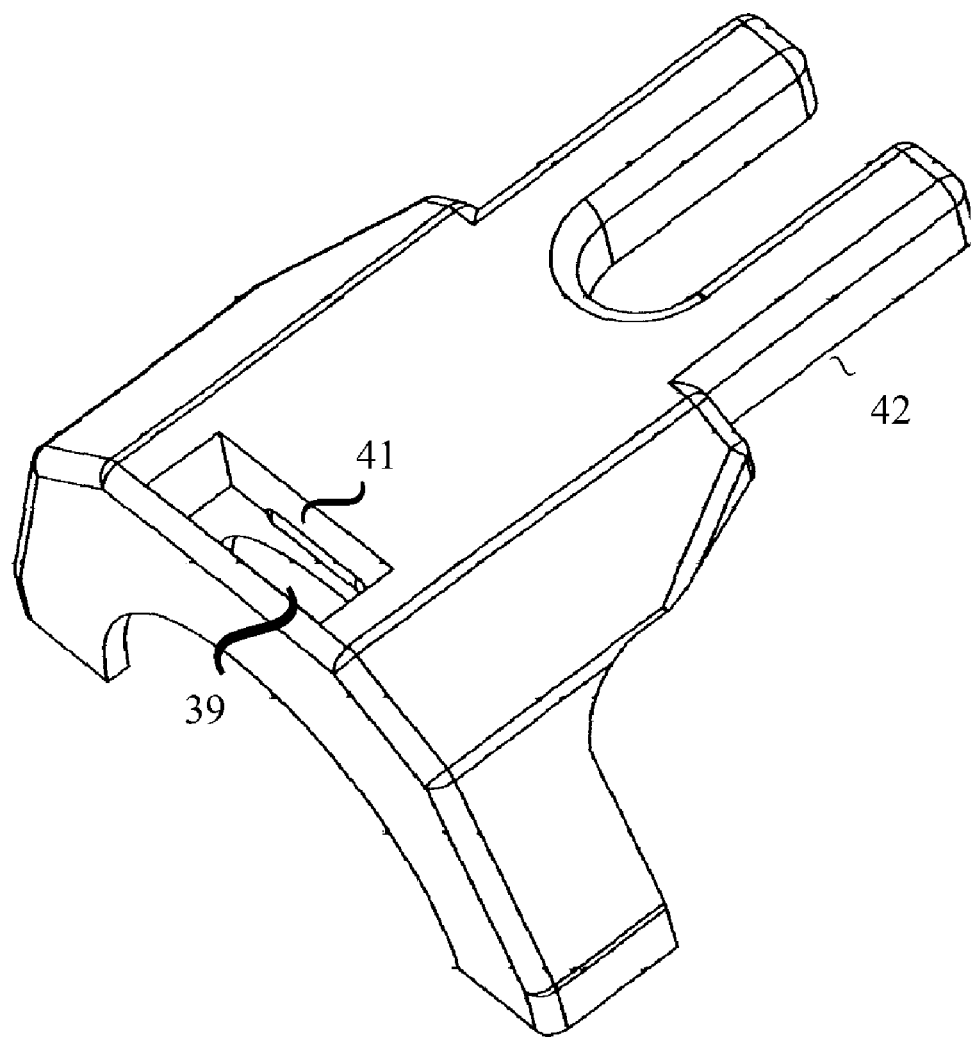
FIG. 3B is a rear perspective view of a takeout jaw according to one embodiment of the present invention.

Inserts 33a and 33b include a wedge shaped body 35 having a semicircular extension 36, which snuggly engages the semicircular upper wall 37 of takeout jaw bodies 34a and 34b. Each insert 33a and 33b also includes an extension 38, which inserts into a corresponding aperture 39 of the associated takeout jaw body 34, as shown in the rear perspective view of FIG. 3B. Inserts 33a and 33b further include an elongated male extension or detante 40, which engages a corresponding elongated female depression 41 in takeout jaw body 34. An object holding aperture is formed between the inserts 33a and 33b when the extension 38 of the given insert 33a or 33b is inserted into aperture 39 of the associated takeout jaw body 34.

The wedge shaped inserts 33a or 33b are inserted into the associated takeout jaw bodies 34, and firmly secured in place. Each takeout jaw 32a and 32b also includes a yoke 42 for attachment to associated bottle making machinery (not shown) and a male alignment pin 43 and a female alignment receptacle 44 to ensure that takeout jaws 32a and 32b are appropriately aligned and engaged during the bottle making process.

Figure 3C:
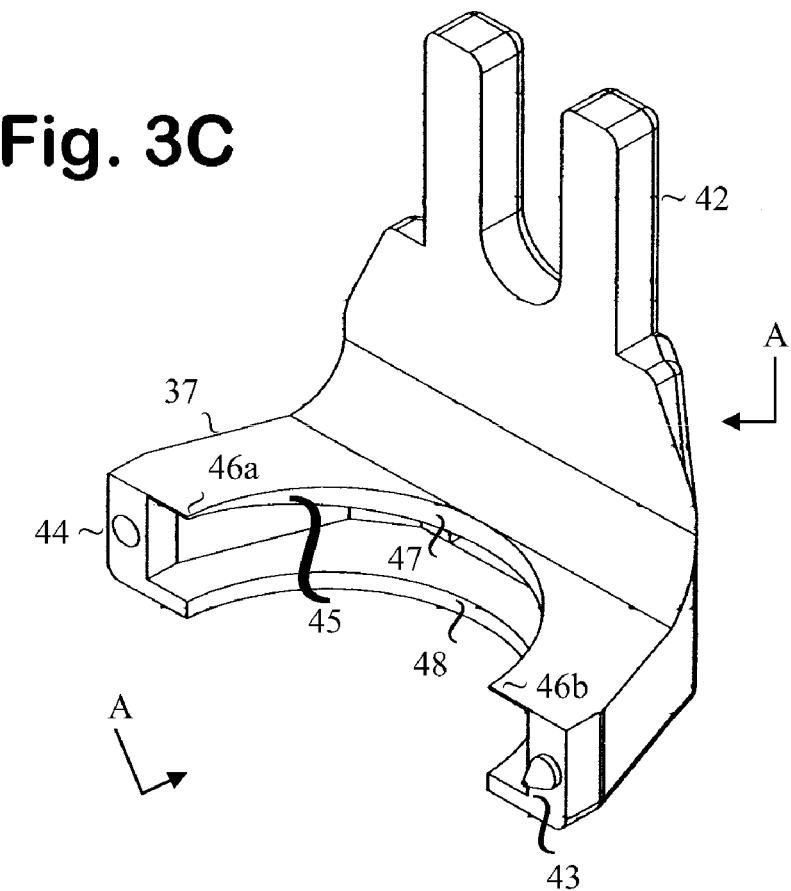
FIG. 3C is a front perspective view of a takeout jaw according to one embodiment of the present invention.
Figure 3D:
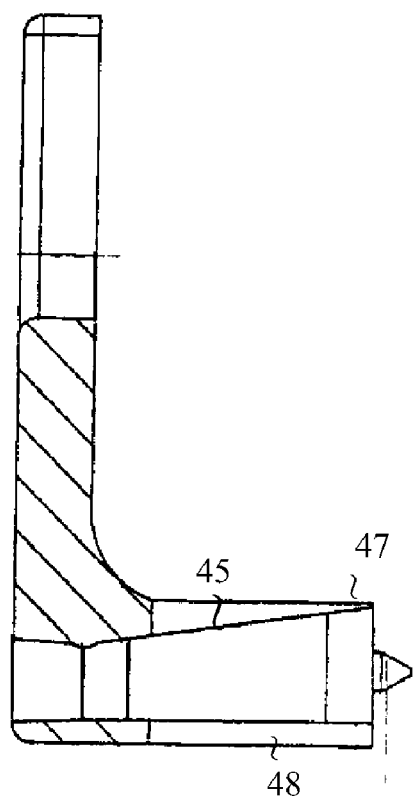
FIG. 3D is a cutaway view taken along line A-A of FIG. 3C.

As shown in further detail in FIG. 3D, which is a cutaway view taken along line A-A of FIG. 3C. Upper inside surface 45 of semicircular upper wall 37 of body 34 is tapered moving along the semicircle to distal points 46. In other words, upper inside surface in formed by a top angle cut. In particular, upper wall 37 of body 34 is thinnest at the distal points 46a and 46b on the semicircle and thickest at the center point 47 of the semicircle. Semicircular lower wall 48 of semicircular body 37 is substantially flat. Therefore, sloped surface 45 and flat surface 58 are spaced apart vertically, to define a wedge shaped slot, which snuggly receives the corresponding sloped and flat surfaces of the associated wedge shaped insert 33.

Figure 3E:
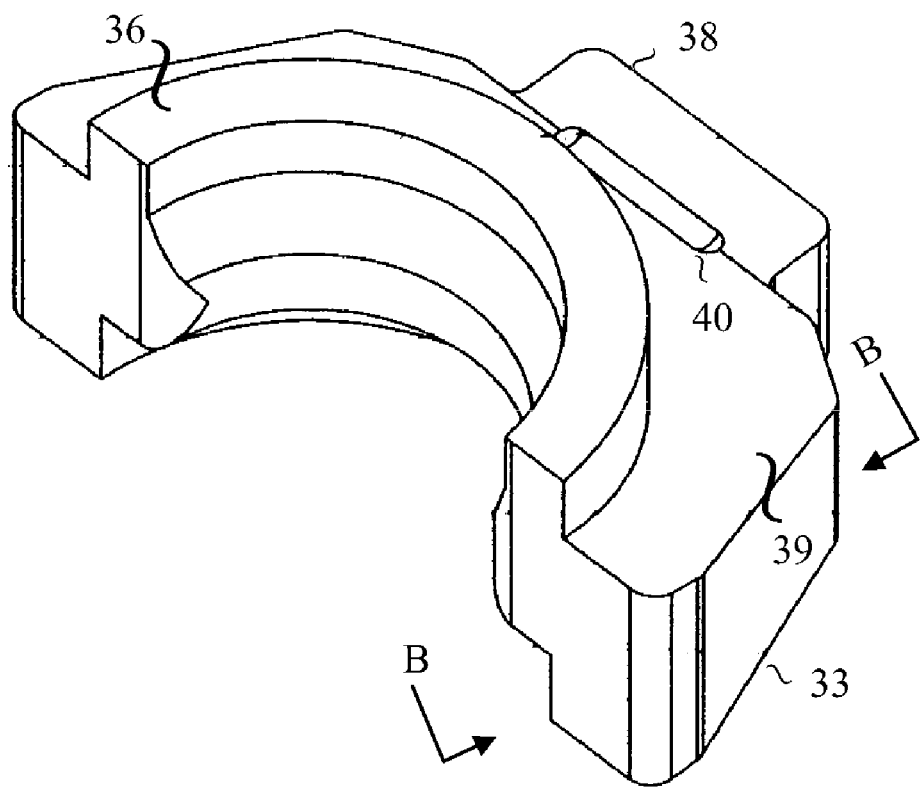
FIG. 3E is a front perspective view of one of the inserts shown in FIG. 3A.
Figure 3F:
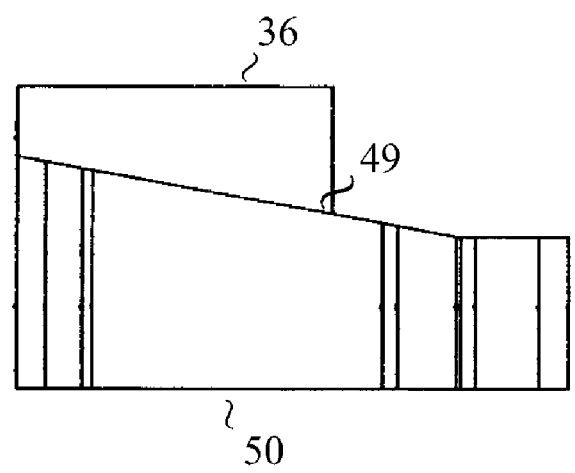
FIG. 3F is a cutaway view taken along line B-B of FIG. 3E.

A selected insert 33 is shown in FIG. 3E. FIG. 3F is a cut away view taken along line B-B of FIG. 3E. Each insert 33 includes a sloped upper surface 49 and a substantially flat lower surface 50, which define a wedge that snuggly fits within the wedge shaped slot defined by sloped surface 45 and flat surface 48 of takeout jaw body 34. A person of ordinary skill in the art will recognize that other configurations can also be used to secure the insert 33.

During bottle making operations, wedge shaped inserts 33a and 33b are inserted into the wedge shaped slot defined by semicircular body 34 of takeout jaws 32a and 32b. Specifically, the sloped upper inside surface 37 of each takeout jaw 32a and 32b mates with the sloped upper surface 49 of the corresponding insert 33. The lower surface 48 of each takeout jaw 32a and 32b engages the corresponding flat surface 50 of insert 33. The result is a wedging effect, in which the top surfaces generate a force against the lower surfaces, thus reduces the movement between inserts 33 and takeout jaws 32a and 32b, thereby reducing or eliminating wear during the bottle making operations. Additionally, the detent 40 of insert 33 may mate the female depression 41 of corresponding takeout jaw 32a and 32b to secure frictionally the insert.

The bottle making machinery attached to yoke 22 of each takeout jaw 32a and 32b position the two takeout jaws 32a and 32b and inserts 33a and 33b around the neck of a bottle, e.g., bottle 27 in FIG. 2. The neck of the bottle 27 is then retained within the circular receptacle defined by the semicircular nature of inserts 33a and 33b. Alignment pins 43 and alignment receptacles 44 ensure that the two takeout jaws 32a and 32b are properly aligned during the procedure. As the bottle making machinery picks up the bottle, wedge shaped inserts 33a and 33b are forced back into the wedge shaped slots defined by takeout jaws 32a and 32b, such that the pressure between inserts 33a and 33b and takeout jaws 32a and 32b further reducing the probability of wear.

Figure 4:
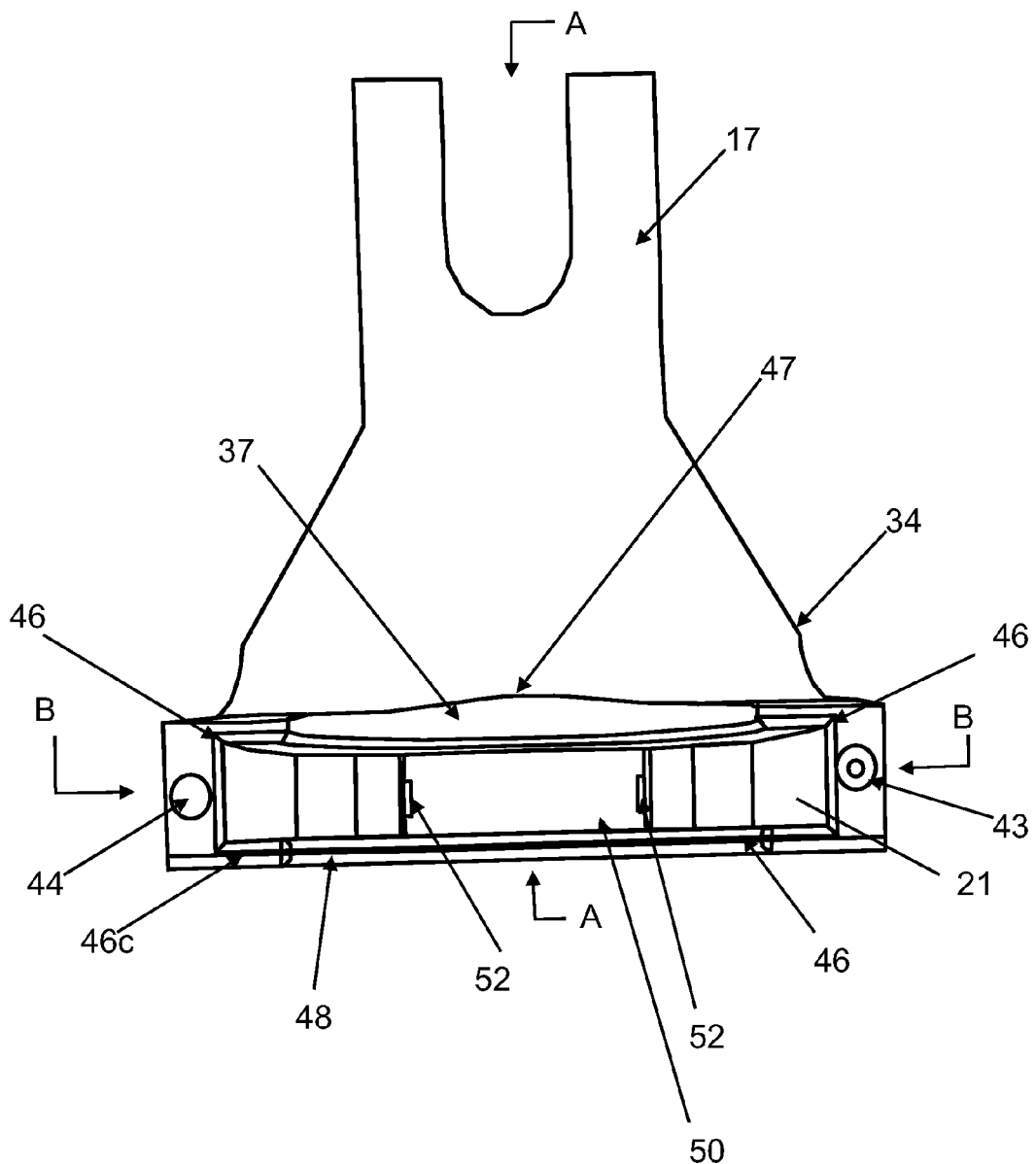
FIG. 4 illustrates a front view of another embodiment of the takeout jaw of the present invention.

With reference to FIG. 4, a frontal view of one embodiment of the takeout jaw 11. The takeout jaw 11 includes a yoke 17 extending from takeout jaw body 34. The takeout jaw body 34 includes the semicircular upper wall 37 and semicircular lower wall 48, which form a semicircular groove 21 to receive an insert (not shown).

The semicircular lower wall 48 is substantially uniform in thickness throughout the takeout jaw body 34. In some embodiments, the thickness of semicircular lower wall 48 maybe varied to create a friction fitting of an insert (not shown). For example, the distal points 46da and 46c may have a thickness that is less than the thickness at other areas of the semicircular lower wall 48. In some embodiments, the thickness of the semicircular lower wall 48 may have a linear relationship to the distance to the distal points 46c and 46d and the center of the semicircular lower wall 48. In other embodiments, the thickness of the semicircular lower wall 48 may fluctuate or have a nonlinear relationship with respect to distance from the distal points 46c and 46d.

The semicircular upper wall 37 has a thickness that increases from the distal points 46a and 46b to the center point 47 of the semicircular upper wall 37. However, the thickness of semicircular upper wall 37 may be substantially uniformed from the distal points 46a and 46b to the center point 47. In some embodiments, the thickness of the semicircular upper wall 37 may have a linear relationship to the distance to the distal points 46a and 46b and the center point 47 of the semicircular upper wall 37. The thickness of the semicircular upper wall 37 may fluctuate or have a non linear relationship with respect to distance from the distal points 46a and 46b.

The takeout jaw body 34 may include a male alignment pin 43 and a female alignment receptacle 44 at distal ends 46. The alignment mechanisms position the jaw bodies 34 during the bottle making process. Different alignment mechanisms including grooves, slots, raised areas, indentions, various shaped features and corresponding receptacle (e.g., squares, ovals, triangles, stars, etc.), different combinations of alignment mechanisms, e.g., a peg and groove on one distal end and a star and groove on the other with the corresponding jaw body 34 having the corresponding receptacle. In addition, the present invention may include electronically controllable mechanisms to align the jaw bodies 34, e.g., the distal ends 46 may have magnetic regions that align the jaw bodies 34. A person of ordinary skill in the art will recognize infinite combinations of aligning mechanism that can be used to position the takeout jaws 32a and 32b.

The semicircular groove 21 includes a receiving aperture 50 formed to receive the insert (not shown). Retaining tabs 52a and 52b extend at least partially into receiving aperture 50 to retain the insert (not shown). The retaining tabs 52a and 52b may extend into the receiving aperture 50 to fit frictionally the insert (not shown). The retaining clips 52a and 52b may also extend into corresponding receptacle (not shown) on the insert (not shown) to secure the insert during operation. In still other embodiments, the insert (not shown) and the receiving aperture 50 both may have retaining tabs 52. The numerous variations and combinations will be known to the skilled artisan.

Figure 5:
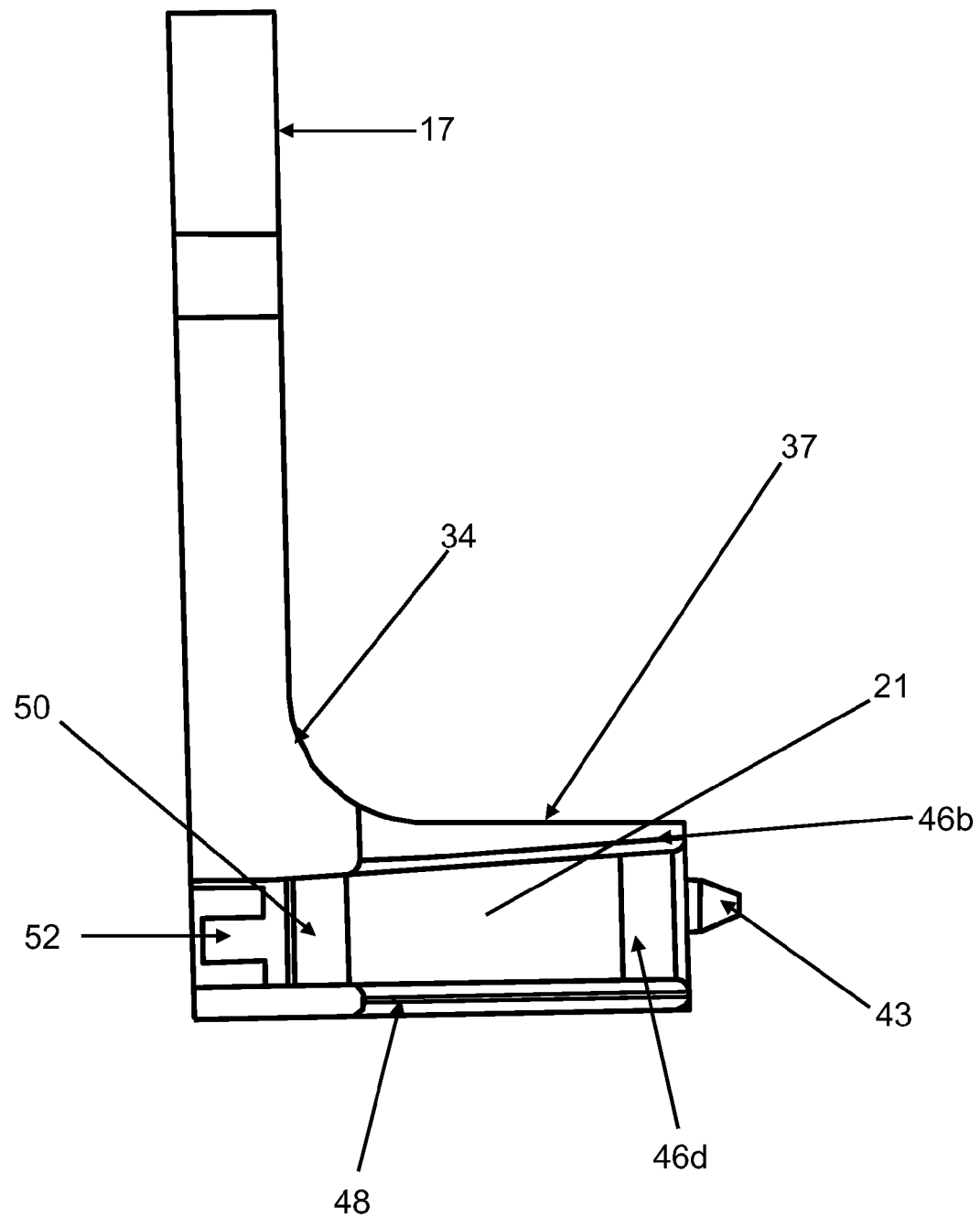
FIG. 5 is a cutaway view taken along line A-A of FIG. 4.

FIG. 5 illustrates the vertical cross section of the takeout jaw 11 through a cutaway view taken along line A-A of FIG. 4. The takeout jaw 11 includes a yoke 17 extending from takeout jaw body 34. The takeout jaw body 34 includes the upper wall 37 and lower wall 48, which form a groove 21 to receive the insert (not shown).

FIG. 5 illustrates the substantially uniform thickness of the lower wall 48; however as noted herein, the thickness of lower wall 48 maybe varied to create a friction fitting of an insert (not shown). The upper wall 37 has a thickness that increases from the distal points 46 to the center point 47 of the upper wall 37; however, as noted herein, the thickness of upper wall 37 maybe substantially uniform. The takeout jaw body 34 includes a male alignment pin 43 and a female alignment receptacle (not shown).

The groove 21 has a receiving aperture 50 formed to receive an insert (not shown). Retaining tab 52 extends at least partially into receiving aperture 50 to retain the insert (not shown) by tension on the insert (not shown). The retaining tab 52a and 52b may also extend into corresponding notches (not shown) on the insert (not shown) to secure the insert (not shown) during operation. Person of ordinary skill will recognize other configuration may be used.

Figure 6:
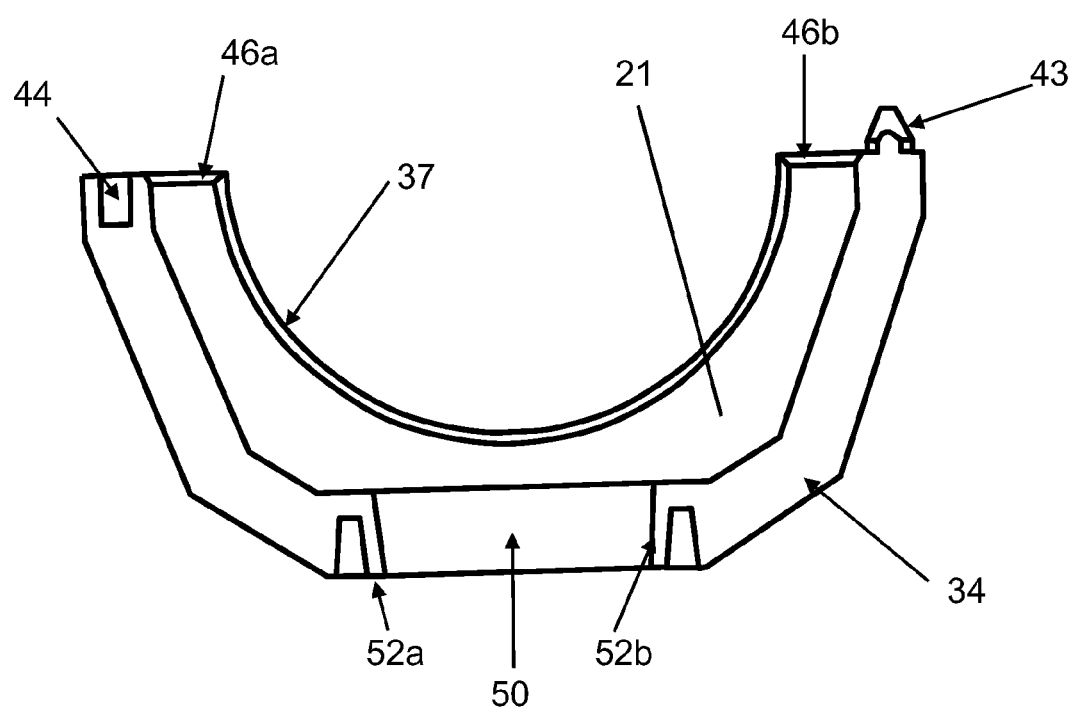
FIG. 6 is a cutaway view taken along line B-B of FIG. 4.

FIG. 6 illustrates the horizontal cross section of the takeout jaw 11 through a cutaway view taken along line B-B of FIG. 4 viewed from the bottom. The takeout jaw body 34 includes the semicircular upper wall 37 with the distal points 46a and 46b and the center point 47. The semicircular upper wall 37 also includes the cutaway portion of the semicircular groove 21 formed between the semicircular upper wall 37 and the semicircular lower wall 48 to receive the insert (not shown).

The takeout jaw body 34 has distal points 46a and 46b, which include a male alignment pin 43 and a female alignment receptacle 44 at distal ends 46. The male alignment pin 43 and female alignment receptacle 44 at distal ends 46 align two jaw bodies 34 during the bottle making process. Other embodiments of the present invention may include different alignment mechanisms as known to the skilled artisan.

The semicircular groove 21 has a receiving aperture 50 formed to receive the insert (not shown). Retaining tabs 52a and 52b extend at least partially into receiving aperture 50 to retain the insert (not shown). The retaining tabs 52a and 52b may extend into the receiving aperture 50 to secure frictionally the insert (not shown). The retaining tabs 52a and 52b may also extend into corresponding receptacle on the insert (not shown) to secure the insert (not shown) during operation.

The retaining tabs 52a and 52b may extend into the receiving aperture 50, thereby exerting force on the insert (not shown) to hold the insert (not shown) into position. In another embodiment, the insert (not shown) may be configured to have retaining tabs (not shown) that extend to the receiving aperture 50 to secure frictionally the insert (not shown). Alternatively, receiving aperture 50 may have a region designed to accommodate retaining tabs 52a and 52b positioned on the insert (not shown). In yet another embodiment, the retaining tabs 52a and 52b may extend into the receiving aperture 50 generally parallel to the semicircular upper wall 37 and the semicircular lower wall 48. The retaining tabs 52a and 52b are contacted by the insert and in turn exert force on the insert (not shown) to secure it into position. The skilled artisan will know that different variations of the retaining tabs 52 may be used with respect to number of tabs, location of tabs, materials of tabs, friction distributed by tabs, texture of the tab surface, etc.

The present invention provides a method for making a ceramic inserts used in manufacturing by combining raw ingredient including one or more ceramic powder to form a ceramic precursor and pressing the ceramic precursor in a die having an insert body in the form of an annulus, having a curved first surface adapted to fit a glass container and a curved second surface adapted to fit a takeout holder. The ceramic precursor is the cured to form a green ceramic precursor and heated to form a green ceramic insert precursor. Optionally, a portion of the insert is covered with a glaze layer. The glaze can contain Mo, W, Ni, Co, Fe, Mn Zr, Ti, Hf, Zn, Ba, Sr, mixtures and combinations thereof in varying rations and concentrations. Alternatively, the glaze may contain between about 30 and 60 mol % of a Si, between about 20 and 50 mol % of a B and between about 0.5 and 25 mol % of a Zn. The skilled artisan will recognize that other coating may be used. In addition, the insert may be further processed through additional coatings, texturing or machining of the profile.

Another example of the present invention includes a method of pressing ceramic inserts used in bottle manufacturing by pressing the ceramic precursor in a die having an insert body in the form of an annulus, having a curved first surface adapted to fit a glass container and a curved second surface adapted to fit a takeout holder; and applying a heat treatment to the ceramic precursor. Optionally, the insert may have a lug extending radially outwardly from a portion of the curved second surface. In addition, the insert may be further processed through other coatings, texturing or milling of the profile.

The present invention can use metal injection molding or (MIM) to manufacture the insert and/or the holder. The MIM process is a manufacturing process which combines the versatility of plastic injection molding with the strength and integrity of machined, pressed or otherwise manufactured small, complex, metal parts.

The present invention includes the use of a mold to form the final product, that mold may be varied in size to allow for a final product of specific dimensions taking into account shrinkage and size variation. Generally, metal injection molding includes four basic steps, namely, mixing fine metal powders with a binder to formulate a feedstock. The feedstock involves combining fine metal powders with a plastic binders which allow the metal to be injected into a mold using standard plastic injection molding machines. The feedstock is molded in an injection molding machine but before the binders are removed, the part is referred to as a 'green part'. The binder is removed from the green part with solvents and thermal processing to produce a brown part. The resultant metal part is sintered at temperatures great enough to bind the particles but not melt the metal. This is but one example of the MIM process and the skilled artisan will readily understand that other MIM process may be used and modifications and variations thereof may be used. The use of MIM in the formation of inserts, holders and/or insert/holder combination allows small tolerances without secondary processes To at least partially solidify the part, the green body is debound to form the brown body. In one exemplary embodiment, a water-based binder is used and the water is removed from the green body. Removal may be performed in any one of numerous manners. For example, the green body may be air-dried to evaporate the water, or quick-dried in a furnace at an elevated temperature. In other embodiments, such as for those methods using wax/polymer-based binders, the green body may be placed into a furnace and the wax may be removed by a melting process. After the brown body is formed, it is placed into a furnace to undergo a sintering process. Any conventional sintering process may be employed. In one example, the brown body can be placed in a sintering furnace and exposed to temperatures of at least about 1500-3500 F. As mentioned previously, the temperature exposure causes the brown body to shrink to a percentage of its original dimensions. After sintering, the component are removed from the sintering furnace.

The iron-based powders that are useful in the practice of the invention also include stainless steel powders. These stainless steel powders are commercially available in various grades, such as the ANCOR 303L, 304L, 316L, 410L, 430L, 434L, and 409Cb powders. Also, iron-based powders include tool steels made by the powder metallurgy method.

The alloying powders that can be admixed with metal-based powders are those known in the metallurgical powder field to enhance the strength, hardenability, electromagnetic properties, or other desirable properties of the final sintered product. Steel-producing elements are among the best known of these materials. Specific examples of alloying materials include, but are not limited to elemental molybdenum, manganese, chromium, silicon, copper, nickel, tin, gold, vanadium, columbium (niobium), metallurgical carbon (graphite), phosphorus, aluminum, sulfur, and combinations thereof. Other suitable alloying materials are binary alloys of copper with tin or phosphorus; ferro-alloys of iron with manganese, chromium, boron, phosphorus, or silicon; low-melting ternary and quaternary eutectics of carbon and two or three of iron, vanadium, manganese, chromium, and molybdenum; carbides of tungsten or silicon; silicon nitride; and sulfides of manganese or molybdenum. Pre-alloyed iron powders that incorporate such alloying elements are available from Hoeganaes Corp. as part of its ANCORSTEEL line of powders.

As mentioned briefly above, feedstock is first made from a mixture of powered metal and binder. The powdered metal may be any one of numerous compositions of metals conventionally used in a metal injection molding process. Examples of suitable powdered metals include, 316 stainless steel and 17-4 PH steel, IN 600, and Hastelloy. Other forms of stainless steel include 440A, 440B, 440C, 440F, 430, 409, 410, 301, 301LN, 304L, 304L, 304LN, 304, 304H, 305, 321, 321H, 316L, 316, 316LN, 316L, 316L, 316, 316Ti, 316LN, 317L, 405, 409, 429, 430, 430F, 430FSe, 434, 436, 442, 446, 403, 410, 414, 416, 416Se, 420, 420F, 422, 431, 440A, 440B, 440C, 501, 502, and 904L. For example, 200 Series: austenitic chromium-nickel-manganese alloys; 300 Series: austenitic chromium-nickel alloys; Type 301: highly ductile, for formed products. Also hardens rapidly during mechanical working; Type 303: free machining version of 304 via addition of sulfur; Type 304: the most common; the classic 18/8 stainless steel; Type 316: the next most common; for food and surgical stainless steel uses; alloy addition of molybdenum prevents specific forms of corrosion. 316 steel is more resistant to corrosion than 18-8 stainless steels. 316 steel is used in the handling of certain food and pharmaceutical products where it is often required in order to minimize metallic contamination. 316 steel is also known as "marine grade" stainless steel due to its increased ability to resist saltwater corrosion compared to type 304. SS316 is often used for building nuclear reprocessing plants; 400 Series: ferritic and martensitic chromium alloys; Type 408: heat-resistant; poor corrosion resistance; 11% chromium, 8% nickel; Type 409: cheapest type; used for automobile exhausts; ferritic (iron/chromium only); Type 410: martensitic (high-strength iron/chromium); Type 416: the most machinable stainless steel; achieved by the addition of extra sulfur which reduces corrosion resistance. Often used for "stainless" rifle barrels; Type 420: "Cutlery grade" martensitic; similar to the Brearley's original "rustless steel". Also known as "surgical steel"; Type 430: decorative, e.g., for automotive trim; ferritic; Type 440: a higher grade of cutlery steel, with more carbon in it, which allows for much better edge retention when the steel is heat treated properly; 500 Series: heat resisting chromium alloys; 600 Series: martensitic precipitation hardening alloys; Type 630: most common PH stainless, better known as 17-4; 17% chromium, 4% nickel.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of molding an injection molded takeout jaw comprising the steps of:
   mixing a material with a binder so as to create an injectable feedstock;
   injecting a feedstock into a takeout jaw mold to form a green takeout jaw, wherein the takeout jaw mold comprises a base comprising a groove adapted to fit an insert and a yoke extending substantially perpendicular from the base to attach the takeout jaw;
   processing the green takeout jaw to remove the binder and form a brown takeout jaw; and
   sintering the brown takeout jaw to form an injection molded takeout jaw.

2. A method of molding an injection molded takeout jaw comprising the steps of:
   injecting a feedstock into a takeout jaw mold to form a green takeout jaw, wherein the feedstock comprises one or more metal powders, wherein the takeout jaw mold comprises a base comprising a groove adapted to fit an insert and a yoke extending substantially perpendicular from the base to attach the takeout jaw;
   processing the green takeout jaw; and
   sintering the brown takeout jaw to form an injection molded takeout jaw.

3. The method of claim 2, wherein the feedstock comprises one or more binders.

4. The method of claim 2, wherein the one or more metal powders comprises a steel, a stainless steel, an alloy or a combination thereof.

5. The method of claim 2, wherein the feedstock comprises 316 stainless steel, 17-4 PH steel, IN 600, 200 series stainless steel, 440A, 440B, 440C, 440F, 430, 409, 410, 301, 301LN, 304L, 304L, 304LN, 304, 304H, 305, 321, 321H, 316L, 316, 316LN, 316Ti, 316LN, 317L, 405, 429, 430F, 430FSe, 434, 436, 442, 446, 403, 414, 416, 416Se, 420, 420F, 422, 431, 501, 502, or 904L.

6. A method of molding an injection molded takeout jaw adapted to fit a takeout holder machine to remove hot bottles from a bottle forming mold comprising the steps of:
   providing an injectable feedstock comprising one or more metals and a binder;
   injecting the feedstock into a takeout jaw mold to form a metal takeout jaw, wherein the takeout jaw mold comprises a semi-circular metal takeout holder base having a front edge having an inner wall that forms an insert opening in the front edge that extends toward a rear edge, a groove within the inner wall formed by a bottom wall, a side wall and a top wall to frictionally fit a corresponding semi-circular insert, and a yoke that extends generally perpendicularly from the semi-circular metal takeout holder base, wherein the yoke is configured to fit a takeout holder machine used to remove hot bottles from a bottle forming mold;
   sintering the metal takeout jaw to form a metal injection molded takeout jaw.

7. The method of claim 6, wherein the groove is tapered with the groove at the front edge wider than the groove at the rear edge to form a wedge shaped profile from the front edge to toward the rear edge to frictionally secure removably the wedge shaped semi-circular insert within the groove.

8. A method of molding an injection molded takeout jaw adapted to fit a takeout holder machine to remove hot bottles from a bottle forming mold comprising the steps of:
   injecting a feedstock into a takeout jaw mold to form a metal takeout jaw, wherein the feedstock comprises one or more metal powders, wherein the takeout jaw mold comprises a semi-circular metal takeout holder base having a front edge having an inner wall that forms an insert opening in the front edge that extends toward a rear edge, a groove within the inner wall formed by a bottom wall, a side wall and a top wall to frictionally fit a corresponding semi-circular insert, and a yoke that extends generally perpendicularly from the semi-circular metal takeout holder base, wherein the yoke is configured to fit a takeout holder machine used to remove hot bottles from a bottle forming mold;
   sintering the metal takeout jaw to form a metal injection molded takeout jaw.

9. The method of claim 8, wherein the one or more metal powders comprises a steel, a stainless steel, an alloy or a combination thereof.

* * * * *